United States Patent
Mann

(10) Patent No.: US 10,105,596 B1
(45) Date of Patent: Oct. 23, 2018

(54) BROADCAST DEPENDENT CONTENT DELIVERY

(71) Applicant: Twitch Interactive, Inc., San Francisco, CA (US)

(72) Inventor: Katherine Marie Mann, Seattle, WA (US)

(73) Assignee: Twitch Interactive, Inc., San Francisco, CA (US)

(*) Notice: Subject to any disclaimer, the term of this patent is extended or adjusted under 35 U.S.C. 154(b) by 73 days.

(21) Appl. No.: 15/190,852

(22) Filed: Jun. 23, 2016

(51) Int. Cl.
    *A63F 13/77* (2014.01)
    *A63F 13/34* (2014.01)
    *A63F 13/95* (2014.01)
    *A63F 13/35* (2014.01)

(52) U.S. Cl.
    CPC ............... *A63F 13/34* (2014.09); *A63F 13/35* (2014.09); *A63F 13/77* (2014.09); *A63F 13/95* (2014.09)

(58) Field of Classification Search
    CPC ........ A63F 13/847; A63F 13/34; A63F 13/35; A63F 13/77
    See application file for complete search history.

(56) References Cited

U.S. PATENT DOCUMENTS

| | | | |
|---|---|---|---|
| 9,597,586 B1* | 3/2017 | Wiklem | A63F 13/12 |
| 9,604,132 B1* | 3/2017 | Wiklem | A63F 13/12 |
| 9,715,789 B1* | 7/2017 | Kane | G07F 17/3274 |
| 2003/0100375 A1* | 5/2003 | Wakae | A63F 13/10 463/43 |
| 2014/0274359 A1* | 9/2014 | Helava | A63F 13/00 463/29 |
| 2015/0072786 A1* | 3/2015 | Perry | A63F 13/10 463/31 |
| 2015/0335999 A1* | 11/2015 | Shimizu | A63F 13/35 463/42 |
| 2016/0166939 A9* | 6/2016 | Chudley | A63F 13/55 463/31 |
| 2017/0006322 A1* | 1/2017 | Dury | H04N 21/254 |

* cited by examiner

Primary Examiner — Jay Liddle
(74) Attorney, Agent, or Firm — Baker & Hostetler LLP

(57) ABSTRACT

Providing extended content to a player of a game depending upon whether the player broadcasts the gameplay to viewers is disclosed. A content item server communicates game output to a plurality of user devices operated by participants in an online game. A game participant selects to stream output from the online game to one or more viewers via a broadcast streaming server. The content item server receives an indication from the broadcast streaming server that the game participant is broadcasting output from the online game to one or more viewers. Based at least upon the indication that a game player is broadcasting game output, the content item server determines to provide additional or extended game content to the game participant who is broadcasting the gameplay.

18 Claims, 9 Drawing Sheets

Game Player Table 210

| Game Account ID 220 | Start Date 222 | Games Played 224 | Streaming Account ID 226 | Chat Account ID 228 | Federated ID 218 |
|---|---|---|---|---|---|
| | | | | | |
| | | | | | |

Game Session Table 230

| Game Session ID 232 | Game Acct ID 234 | Score 238 | Stream Session ID 240 | Duration 242 | Viewers 244 | Chat Session ID 250 | Duration 252 | Participants 252 |
|---|---|---|---|---|---|---|---|---|
| | | | | | | | | |
| | | | | | | | | |

FIG. 2

Streaming Subscriber Table 310

| Streaming Account ID 320 | Start Date 322 | Games Streamed 324 | Game Account ID 326 | Chat Account ID 328 | Federated ID 318 |
|---|---|---|---|---|---|
| | | | | | |

Streaming Session Table 330

| Stream Session ID 332 | Streaming Account ID 334 | Game Session ID 336 | Viewer's Streaming Account ID 338 | Viewer Total 340 | Duration 342 |
|---|---|---|---|---|---|
| | | | | | |

FIG. 3

Chat Subscriber Table 410

| Chat Account ID 420 | Start Date 422 | Chat Sessions 424 | Game Account ID 426 | Stream Account ID 428 | Federated ID 418 |
|---|---|---|---|---|---|
| | | | | | |

Chat Session Table 430

| Chat Session ID 432 | Chat Account ID 434 | Game Session ID 436 | Chat Participants IDs 438 | Participants Total 440 | Duration 442 |
|---|---|---|---|---|---|
| | | | | | |

FIG. 4

BROADCAST DEPENDENT CONTENT DELIVERY

BACKGROUND

In the online gaming environment, persons other than those participating in a game are often interested in viewing the play between game participants. Specialized broadcast systems have been developed that broadcast streams of game play to viewers. Using a broadcast system, a game player may elect to stream the output from a game in which the player is participating to other interested persons. For example, a game player may elect to broadcast game output to friends, frequent game competitors, etc.

Broadcast streaming systems allow individuals to subscribe to receive streamed output of games played by particular players. When a particular player participates in a game and requests to broadcast the game output, persons who have been identified to view the gameplay of the particular player receive a stream of the game output. The development of broadcast streaming systems has resulted in scenarios where numerous viewers are able to view the playing by a particular game participant. Indeed, a single game player may have hundreds of persons who receive streamed output of games participated in by the player.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

FIG. 2 depicts example tables illustrating data stored in an example database.

FIG. 3 depicts example tables illustrating data stored in an example database.

FIG. 4 depicts example tables illustrating data stored in an example database.

DETAILED DESCRIPTION

Figure 1:
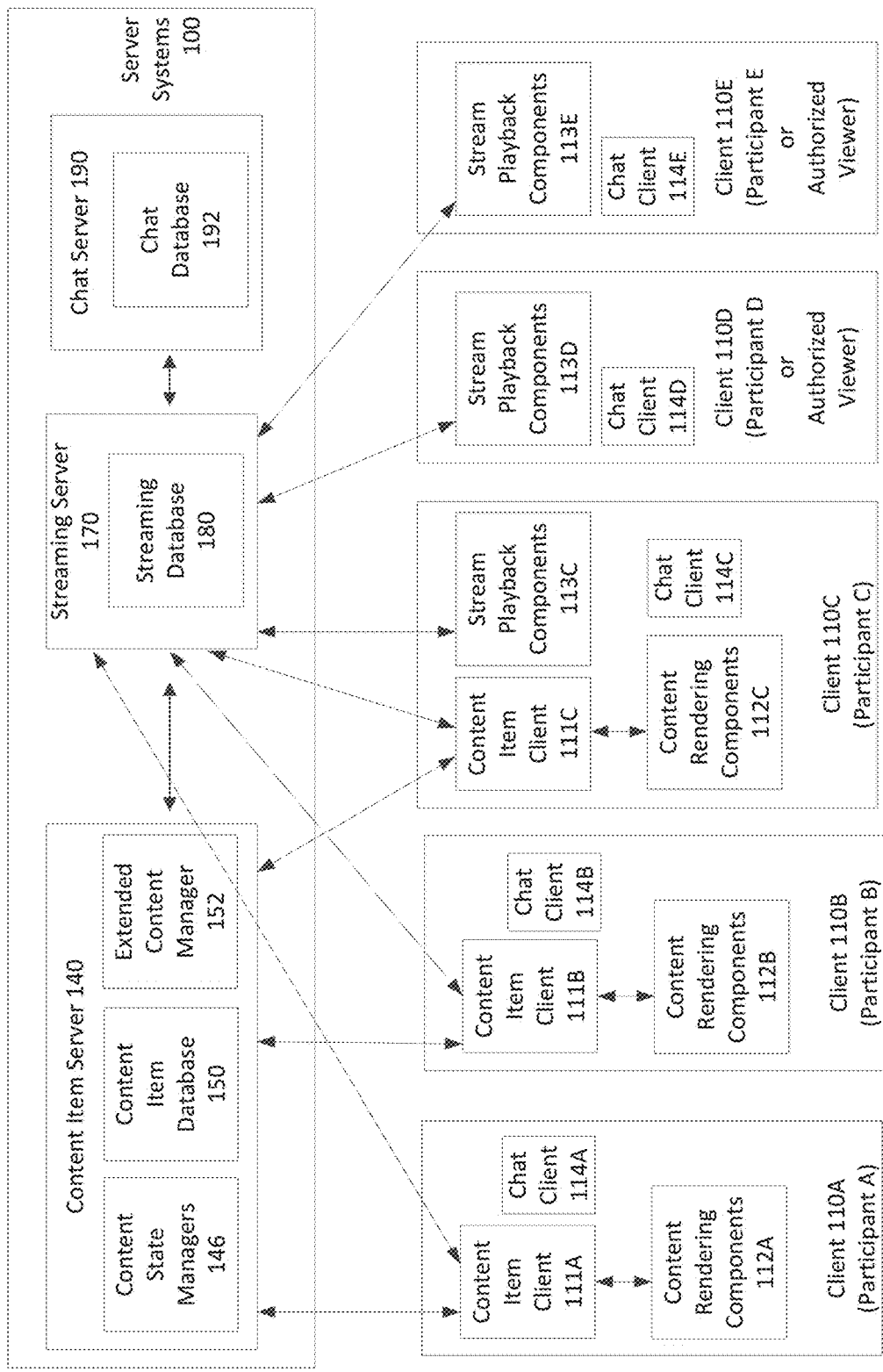
FIG. 1 depicts an example computing environment for content item distribution and output streaming.

The development of broadcast streaming systems has added a new dimension to online gaming and greatly expanded interest and participation. Not only are the game participants interested in games, but the many persons that view the gameplay are also interested in particular players and the outcome of particular games. Even though the broadcast streaming systems have resulted in expanded interest in gaming, online gaming systems continue to operate largely independently of broadcast streaming systems. Online gaming systems provide gaming functionality to players of games while the broadcast streaming systems operate to route gaming output to interested viewers. The operation of one system does not directly influence the operation of the other.

Applicant discloses herein systems and methods that provide extended content to a player of a game depending upon whether the player performs activities in relation to the gameplay such as broadcasting the gameplay to one or more viewers and/or chatting with one or more interested persons regarding the gameplay. In an example embodiment, if the player broadcasts gameplay to other viewers via a broadcast streaming system, the game server providing game content to the player provides extended game content to the player that would not otherwise be available had the player not broadcast the gameplay. For example, the game may make available to the particular game player additional game features or functions that would not otherwise be available if the particular game player was not broadcasting the gameplay. In an example scenario where during typical operation a game provides a selection of tools such as, for example, virtual armaments to a player, the game player who is broadcasting the game will have additional armatures from which to select. In another example scenario where a game provides a selection of virtual vehicles for use in a game, the game player who is broadcasting the game may have additional vehicles from which to select. Accordingly, the game player has extended content available to her as a consequence of the player acting to broadcast the game output to others.

In an example game environment, a game server is programmed to provide gaming functionality to one or more game clients executing on client devices. Game participants use client devices to communicate over a network with the gaming server and thereby engage in playing a game with each other. For example, a first game participant may use a first client device and a second game participant may use a second client device to communicate with an online video game server and communicate through the game server to play a game with each other.

Game clients are programmed to receive user inputs requesting to stream game output to non-participants. The inputs may specify the particular non-participants to whom the game should be streamed. Alternatively, the inputs may specify that the game output should be streamed to viewers who have subscribed to receive streams from the particular game player. In response to user inputs, the game client generates and transmits a request to a broadcast streaming server. The request comprises any data suitable for initiating streaming of the game output. For example, the request may include data identifying a game account identifier associated with the particular game player making the request, data identifying the particular game, and data identifying the particular game session that is to be broadcast.

The broadcast streaming server is programmed to receive the request, create a streaming session corresponding to the request, and communicate the game output received from the game client to the viewers who have been and/or are subsequently identified to receive the game output. In connection with creating and maintaining a streaming session, the broadcast streaming server is programmed to collect and maintain data regarding each person that sends and receives a game stream, as well as details regarding the individual streaming sessions. For example, the broadcast streaming server may maintain data identifying each requested streaming session, the game player that requested the streaming session, the particular viewers that are viewing the stream, and the total number of viewers of the stream.

The broadcast streaming server, in addition to broadcasting the data stream to viewers, is programmed to communicate an indication that a game player has initiated a streaming session to the particular game server that is serving the game content. In an example embodiment, the broadcast streaming server communicates data identifying a broadcast streaming session, an identifier corresponding to the particular game player who is broadcasting the game stream, and data identifying the particular game and/or game session.

In response to the indication that the game is being broadcast, the gaming server determines whether additional information is needed in order to resolve whether or not extended game content should be made available to the particular game player. For example, the gaming server may determine that the determination as to whether or not extended content should be made available depends not only on whether the game player is broadcasting the game output, but also on the number of viewers to whom the game is being broadcast. Where additional data is needed, the game server generates a request to the broadcast server. In an example scenario wherein additional data is needed regarding the number of viewers, the game server generates and transmits a request for data specifying the number of viewers.

The broadcast streaming server receives the request and queries its data storage for relevant information. For example, in the scenario where the request seeks the number of viewers of the broadcast stream, the broadcast streaming server queries its data storage to determine the number of viewers of the particular data stream. The broadcast streaming server transmits the responsive data to the game server.

The game server receives the responsive data and stores it in its data store. For example the game server may store the data in a database in relation to the game account identifier for the particular player, the game session identifier for the relevant game session, and/or the streaming session identifier corresponding to the particular broadcast streaming session.

The game server uses the received information to determine whether or not the player who is streaming the game output should receive extended game content. In an example scenario, the game server may require a threshold number of viewers of the game broadcast before extended content is provided to the player broadcasting the game content. In such an embodiment, the game server may compare the number of viewers of the particular game stream to a determined threshold. If the game server determines that the threshold has been satisfied, the game server makes extended content available to the game player broadcasting the game. If the game server determines that the threshold has not been satisfied, the game server continues providing game content without providing the extended content to the particular game player responsible for streaming the content.

In the scenario where the game server determines extended content should be made available, the game server makes the extended content available during the operation of the game. The extended content may be any content that is suitable for the particular game. For example, if the game plot includes that concept of a race, and the game players may select various vehicles or means of travel at various stages of the race, extended content may be an additional vehicle that is only made available to players that are broadcasting the game. By way of further example, if the game plot includes the concept of a war between players, extended content may be one or more additional armaments or munitions that are exclusively available to players that broadcast the game fee.

The game server is adapted to make the game content available to the game player at the appropriate moment in the game. For example, in the scenario where the extended content is an additional vehicle type that is made available to the game player, the content is displayed to the game player at the point or location in the game flow where the player selects vehicles for use.

The game server may be programmed to periodically determine whether the criteria for providing access to extended content continue to be satisfied. For example, after thirty minutes have passed since determining to provide extended game content, the game server may request updated data from the broadcast server and reevaluate whether the criteria for providing extended content continue to be satisfied. If so, the game server continues to provide the extended game content. If not, the game server discontinues making the extended content available.

In an example embodiment, the game server may determine whether or not to make extended content available to a game player based upon a player's activities in addition to broadcast streaming. For example, the game server may receive an indication that the game player is chatting with non-game players regarding the on-going game. The game server may determine whether or not to provide extended game content based upon the whether the player is engaged in a chat, and additionally the number of participants in the chat. Still further, the game server may determine whether or not to make extended content available based upon multiple activities by the game player including broadcasting of the gameplay as well as chatting regarding a gameplay.

Example Computing Environment

FIG. 1 is a diagram illustrating an example computing environment suitable for providing extended game content to a game player depending upon whether the player performs activities in relation to the gameplay such as broadcasting the gameplay to one or more viewers and/or chatting with one or more interested persons regarding the gameplay. An example computing environment comprises server systems 100 and client systems or nodes 110A-E. Server systems 100 comprise content item server 140, streaming server 170, and chat server 190. Content item server 140 is programmed to provide content services such as gaming services to client devices. Streaming server 170 is programmed to broadcast stream output from client device applications that interact with content item server 140 to other client devices. Chat server is programmed to communicate text chat between client applications on client nodes 110A-E. Server systems 100 and client nodes 110A-E are programmed to communicate with one another over one or more communication networks, including, for example, one or more local area networks (LAN's) and wide area networks (WAN's), such as the Internet. Server systems 100 may be distributed across any number of different servers and/or devices located at any number of different locations, which may themselves communicate over any number of different communications networks.

As shown in FIG. 1, client nodes 110A-C each include a respective content item client 111A-C which corresponds to and communicates with content item server 140. Content item clients 111A-C and content item server 140 may collectively execute a content item. A content item may be any computing functionality which, in the example instance of FIG. 1, comprises a portion executing on content item server 140 and a portion executing on client devices 110A-C. In an example embodiment, the content item may be a massively multiplayer online (MMO) video game or other video game. In such an embodiment, content item server 140 is a game server and content item clients 111A-C are game client application instances.

Persons operating client devices 110A-C, who in the gaming context may be referred to as players or participants, log on or otherwise connect to the content item, i.e. video game, using content item clients 111A-C. In the example scenario depicted in FIG. 1, client 110A is operated by Participant A, client 110B is operated by Participant B, and client 110C is operated by Participant C. In an example embodiment, participants connect to the content item by providing, via content item clients 111A-C, identity and authentication information, such as a user name and password, which may be matched by server components 100 to an existing username and password for the participant.

In the scenario wherein the content item is a game, each content item client 111A-C may, on behalf of a respective player or participant, control a respective character or other participant-controlled entity within the content item. Each content item client 111A-C receives participant input information, such as may be provided though one or more user input components (e.g., touch screen, controller, camera, microphone, mouse, keyboard, etc.) at clients 110A-C. For example, participants may provide input for controlling respective characters, such as by performing various actions (e.g., firing a weapon, driving a car, moving from one location to another, etc.). Upon receiving the participant input information, content item clients 111A-C collect and forward content state data associated with the user input to the content item server 140.

Upon being received by content item server 140, incoming content state data from content item clients 111A-C may be provided to content state managers 146. Content state managers 146 generally performs operations related to communication of content item state among content item clients 111A-C. For example, in some cases, content state managers 146 may identify an update to content state data from one of content item clients 111A-C and then forward the update to each other content item client 111A-C, such that each of content item clients 111A-C are able to update and maintain respective versions of the state of the content item. For example, each of content item clients 111A-C may, in some cases, receive, from content state managers 146, updates regarding actions performed by other characters controlled by other content item clients 111A-C.

In addition to forwarding information about participant-controlled characters, content item server 140 may also provide, to content item clients 111A-C, information about other objects within a virtual area of the content item. For example, content item server 140 may provide information about objects such as trees, clouds, lakes, rivers, cliffs, birds, fish, animals, structures, vehicles, non-player characters (NPC's), and many other objects. The provided information may include, for example, any information associated with rendering of the objects at the respective clients 110A-C, such as location, orientation, size, color, texture, shading, lighting, reflectivity, associated audio data, and any other associated information.

Upon being received by content item clients 111A-C, the state, object, and other content item information from content item server 140 may be processed and then used to render image data, such as video data, associated with the content item. In particular, content item clients 111A-C may provide the received content item information to respective content rendering components 112A-C for rendering of image data, such as video data, associated with the content item. In greater detail, for example, content rendering components 112A-C may include one or more graphics processing units (GPU's) for rendering of image data, such as video data, as well as various audio processing components for processing and rendering of audio data. As should be appreciated, the GPU's and/or other image data processing components may perform various graphics rendering operations, such as geometry operations, shading, texturing, lighting, and other graphics pipeline operations. Upon being rendered, the image and audio data associated with the content item may be presented using one or more output devices (e.g., display screen, speakers, etc.).

Content item server 140 further comprises extended content manager 152. Extended content manager 152 is programmed to provide additional or extended content to game players depending upon the activities of the game players in connection with the game. For example, in instances where extended content manager 152 determines a game player is streaming output of a game via streaming server 170, extended content manager 152 may determine to provide additional or extended content to the particular game player. In another embodiment, extended content manager 152 may additionally or alternatively determine a game player has initiated a chat session relating to an ongoing game session, and based upon the determination, provide additional or extended content to the particular game player that initiated the chat. Extended content manager 152 may communicate with streaming server 170 and chat server 190 as needed to retrieve data for use in determining the status streaming and/or chat sessions and whether or not to provide extended content.

Content item server 140 comprises database 150 in which is stored information relating to the services provided by content item server 140. For example, content item server 140 stores in content server database 150, data identifying individual accounts of players or participants who are registered to play the game service provided by content item server 140. In an example embodiment, content server database 150 may comprise a game account ID for each player that has account with content item server 140 along with information about the particular player such as number of games played, time spent playing, game scores, original date of joining, etc. Information relating to the particular game sessions including session identifiers and the participants or players assigned to each session are also captured and stored in content server database 150 by content item server 140. For example, content item server 140 may store in content server database 150 a session ID for each game session controlled by server 140 and store in relation to each session ID the account IDs of players assigned to or participating in the particular session.

FIG. 2 provides a graphical depiction of data that may be stored in an example embodiment of database 150. Game player table 210 comprises data relating to the persons or players who are registered to play a particular online game. As shown, player table 210 stores for each registered game player a game account ID 220 that is used to uniquely identify the player within the game system 140. Game player table 210 further comprises for each registered game player, historical information about the game player relative to the system such as, for example, the following: start date 222 identifying the date the particular player joined or registered with the system; and games played 224 identifying the total number of game sessions the particular player has participated in. Game player table 210 may further comprise for each registered game player, data identifying corresponding identifiers used to identify the particular person on systems that may be used in conjunction with the gaming system 140. For example, the game player table 210 may have stored therein a streaming account identifier 226 which is a unique identifier used within streaming server 170 to uniquely identify the particular user. Additionally, game player table 210 may have stored therein a chat account identifier 228 which is a unique identifier that is used within streaming chat server 190 to uniquely identify the particular person within the chat server 190. Content item server 140 may receive values for the streaming account identifier 226 and chat account identifier 228 during the particular game player's initiation and registration with each of streaming server 170 and chat server 190. In an example scenario, a game player may have an identifier that applies to the player across multiple independent systems. For example, and as illustrated in FIG. 2, a game player may have an associated federated identifier 218 which may be used across content item server 240, streaming server 170, and/or chat server 190 to refer to the same person. In such a scenario, the user may be referred to using the federated identifier 218 rather than one of the other account IDs 220, 226, 228 in connection with communications by and between systems 140, 170, and 190.

Database 150 may further have stored therein game session table 230. Game session table may have stored therein for each game session, a game session ID 232 which uniquely identifies the game session within system 140. Also recorded for each game session is the game account identifiers 234 for each of the players participating in the particular game session along with each participant's score 238. Game session table 230 further comprises for each game session ID, information regarding related activities executing at broadcast streaming server 170 and chat server 190. For example, game session table 230 may have stored there in the stream session identifier 240 corresponding to a streaming session that has been initiated for the particular game session. Along with the streaming session identifier, the game session table may have stored therein data related to the streaming session. For example, stored with the streaming session identifier 240 and in relation to the corresponding game session identifier 232 is data identifying the length or duration 242 of the streaming session and the number of viewers 244 of the broadcast streaming session. Game session table 230 may further have stored therein chat session identifier 250 corresponding to any chat session that has been initiated for the particular game session. Along with the chat session identifier, the game session table 230 may have stored therein data relating to the chat session. For example, stored with the chat session identifier 250 and in relation to the corresponding game session identifier 232 is data identifying the length or duration 252 of the chat session and the number of chat session participants 254.

Streaming server 170 is adapted to stream output received from client nodes 110 to other client nodes. For example, in the scenario where a Participant A is operating a gaming application on device 110A, the output rendered on device 110A may be communicated to streaming server 170. Streaming sever 170 communicates the streamed output to client nodes that have requested or subscribed to receive the output from device 110A. In an example scenario wherein client nodes 110D and 110E have previously subscribed with streaming server 170 to receive output from Participant A executing a particular content item such as a particular game, streaming server 170 streams the output content stream received from client node 110A to nodes 110D and 110E. Streamed image and audio data received from streaming server 170 at client nodes 110D and 110E is presented to Authorized Viewers D and E, respectively, by respective stream playback components 113D and E via output components, such as, for example, a display screen and audio speakers. Stream playback components 113C-E may include any components that are capable of playing streamed image and audio data, such as a web browser, various well-known video and/or audio players, and the like. It will be appreciated that client nodes 110 may have both a content item client 111 component and stream playback component 113. Accordingly, client nodes 110A-E may be used both to participate in a content item such as a game application, as well as view the output stream generated by a user participating in a content item.

As shown, streaming server 170 comprises streaming database 180 which is adapted to store data relating to the services provided by streaming server 170. For example, streaming database 180 is adapted to store data identifying persons who have registered to stream data through streaming server 170 and/or to receive streaming output through streaming server 170. In an example embodiment, streaming server database 180 may comprise a streaming account ID for each person, i.e. subscriber, who has an account with streaming server 140 entitling the person to stream game output and/or to receive streamed output. Stored in relation to the streaming account ID for each subscriber are details regarding streaming participated in by particular subscriber. For example, a particular subscriber's streaming account ID may have stored in relation to it data identifying a date the particular user registered with streaming server and the number of games the particular subscriber has streamed via the streaming server. Additionally, stored in relation to a subscriber's streaming account identifier may be account identifiers used in content item server and chat server to identify the same person. Streaming database 180 may further have stored therein data relating to streaming sessions performed through streaming server 170. For example, streaming database may create and have stored therein a streaming session identifier for each session streamed through streaming server 170. Stored in relation to the streaming session identifier are data regarding the session such as, for example, the streaming account identifier of the subscriber who initiated the session, a game session identifier of the game being streamed, the streaming account identifiers of the viewers of the stream, the duration of the stream session, and the total number of viewers of the stream.

FIG. 3 provides a graphical depiction of data that may be stored in an example embodiment of streaming database 180. As shown, streaming database 180 comprises a streaming subscriber table 310 that stores information about persons who are registered with the system 170 enabling the person to stream content and to receive streamed content. Streaming subscriber table 310 comprises for each registered streaming user, a streaming account ID 320 that is used to uniquely identify the streaming subscriber within the system. Streaming subscriber table 310 further comprises for each registered subscriber, information identifying historical information about the streaming engaged in by the particular subscriber such as, for example, the following: start date 322 identifying the date the particular subscriber joined the system; and games streamed 324 identifying the total number of game sessions the particular subscriber has streamed. Streaming subscriber table further comprises for each registered account, data identifying corresponding identifiers for the particular person on systems that may be used in conjunction with streaming server 170. For example, the streaming subscriber table 310 may have stored there in a game account identifier 326 which is the unique identifier used within content item server 140 to uniquely identify the particular user. Additionally, streaming subscriber table 310 may have stored therein a chat account identifier 328 which is the unique identifier that is used within streaming chat server 190 to uniquely identify the particular game player. Streaming server 170 may receive values for the game account identifier 326 and chat account identifier 328 during the particular game player's initiation and registration with each of content item server 140 and chat server 190. As noted above in connection with the game player table 210, a person may have a federated identifier that applies to the person across multiple independent systems. Accordingly, as illustrated in FIG. 3, a person registered with a streaming server 170 may have an associated federated identifier 318 which may be used across content item server 240, streaming server 170, and/or chat server 190 to refer to the same person. In such a scenario, the user may be referred to using the federated identifier 318 rather than one of the other account IDs 220, 226, 228 in connection with communications by and between systems 140, 170, and 190.

Streaming database 180 further comprises related streaming session information table 330 which is adapted to record information relating to streaming of particular games by the streaming subscribers. As shown, streaming information table 330 comprises for each streaming session a streaming session ID 332 which uniquely identifies the streaming session within the streaming server 170. Stored in relation to the particular streaming session identifier 332 is the streaming account identifier 334 of the subscriber who requested to stream the game output. Also stored in relation to the stream session identifier 332 is game session identifier 336 identifying the particular gaming session that is being streamed. Recorded in relation to the particular streaming session 332 are the streaming account identifiers 338 of the persons who are receiving the broadcast stream from streaming server 170. Still further, stored in relation to streaming session identifier 332 are the total number of viewers 340 and the duration 342 of the streaming session.

Chat server 190 is adapted to communicate text chat between chat clients 114A-E executing on client devices 110A-E. For example, a Participant A, who may be operating a gaming application on device 110A, may also establishes a chat session using chat client 114A with chat server 190. Chat server 190 communicates the text input received from chat client 114A to the one or more of Participants B-E with whom Participant A has established a chat session. Chat server 190 communicates the chat session text to the chat client 114 executing on the relevant one or more of client devices 110B-E. It will be appreciated that each of client nodes 110A-E may comprise chat clients 114 in addition to content item client 111 component and stream playback component 113. Accordingly, client devices 110 may be employed to participate in a content item such as a game application, view the output stream generated by a user participating in a content item, and/or participate in a chat session regarding the output stream.

As shown, chat server 190 comprises chat database 192 which is adapted to store data relating to the services provided by chat server 190. For example, chat database 192 is adapted to store data identifying persons who have registered to participate in chat sessions through chat server 190. In an example embodiment, chat server database 192 may comprise a chat account ID for each person who has an account with chat server 190 entitling the person to generate and receive chat text. Stored in relation to the chat account ID for each chat subscriber are details regarding chat sessions participated in by particular subscriber. For example, a particular subscriber's chat account ID may have stored in relation to it data identifying a date the particular user registered with chat server 190 and the number of chat sessions the particular subscriber has participated in via the chat server 190. Additionally, stored in relation to a subscriber's chat account ID may be account identifiers used in content item server 140 and streaming server 170 to identify the same person. Chat database 192 may further have stored therein data relating to chat sessions performed through chat server 190. For example, chat database 192 may create and have stored therein a chat session identifier for each chat session communicated through chat server 190. Stored in relation to the chat session identifier are data regarding the chat session such as, for example, the chat account identifier of the subscriber who initiated the chat, a game session identifier of a game that may be being played, the chat account identifiers of the chat participants, the duration of the chat session, and the total number of chat participants.

FIG. 4 provides a graphical depiction of data that may be stored in an example embodiment of chat database 192. As shown, chat database 192 comprises a chat subscriber table 410 that stores information about persons who are registered with chat server 190 enabling the person to participate in chat sessions. Chat subscriber table 410 comprises for each registered streaming user, a chat account ID 420 that is used to uniquely identify the chat participant within the system. Chat subscriber table 410 further comprises for each registered subscriber, historical information about the chat sessions engaged in by the particular subscriber such as, for example, the following: start date 422 identifying the date the particular subscriber joined the system; and sessions chatted 424 identifying the total number of chat sessions the particular subscriber has participated in. Streaming subscriber table further comprises for each registered chat account, data identifying corresponding identifiers for the particular person on systems that may be used in conjunction with chat server 190. For example, the chat subscriber table 410 may have stored therein game account identifier 426 which is the unique identifier used within content item server 140 to uniquely identify the particular user. Additionally, streaming subscriber table 410 may have stored thereon streaming account identifier 328 which is the unique identifier that is used within streaming server 170 to uniquely identify the particular person. Chat server 190 may receive values for the game account identifier 426 and stream account identifier 428 during the particular chat participant's initiation and registration with each of content item server 140 and streaming server 170. As noted above in connection with the game player table 210, a person may have a federated identifier that applies to the person across multiple independent systems. Accordingly, as illustrated in FIG. 3, a person registered with a chat server 190 may have an associated federated identifier 418 which may be used across content item server 240, streaming server 170, and/or chat server 190 to refer to the same person. In such a scenario, the user may be referred to using the federated identifier 418 rather than one of the other account IDs 220, 226, 228 in connection with communications by and between systems 140, 170, and 190.

Chat database 192 further comprises related chat session information table 430 which is adapted to record information relating to particular chat sessions. As shown, chat session information table 430 comprises for each chat session a chat session ID 432 which uniquely identifies the chat session within the chat server 190. Also recorded is the chat account ID 434 of the individual who initiated the chat. Stored in relation to the particular chat session identifier 432 is information identifying related sessions on content item server 140 and streaming server 170. For example, if the particular chat session relates to a particular game session, chat session table 430 may have stored in relation to the chat session identifier 432 the game session identifier 436 for the corresponding game session. Also recorded in relation to the particular chat session 432 are the chat account identifiers 438 of the persons who are receiving the broadcast stream from chat server 190. Still further, stored in relation to chat session identifier 332 are the total number of chat participants 440 and the duration 442 of the chat session.

Content item server 140, and extended content manager 152 in particular, is programmed to provide extended content to a player of a game depending upon whether the player performs activities in relation to the gameplay such as broadcasting the gameplay to one or more viewers and/or chatting with one or more interested persons regarding the gameplay. In an example embodiment, if extended content manager 152 determines that a game player is broadcasting gameplay to other viewers via broadcast streaming system 170, extended content manager 152 determines to provide extended game content to the player that would not otherwise be available had the player not broadcast the gameplay. Extended content manager 152 may have further rules or requirements for determining whether to provide extended content. For example, extended content manager 152 may require that the game be broadcast to a threshold number of persons. Additionally, or alternatively, extended content manager 152 may determine to provide extended content where the game player has initiated a chat regarding the game session.

Where extended content manager 152 determines to make extended content available, extended content manager 152 makes available to the particular game player additional features or functions that would not otherwise be available if the particular game player was not broadcasting the gameplay. In an example scenario where a game provides a selection of tools such as, for example, virtual armaments to a game player for use in the game, the game player who is broadcasting the game will have additional armatures from which to select to use in the game. In another example scenario where a game provides a selection of virtual vehicles for use in a game, the game player who is broadcasting the game may have additional vehicles from which to select. Accordingly, the game player has extended content available to her as a consequence of the player acting to broadcast the game output to others.

Example Extended Content Processing

Figure 5:
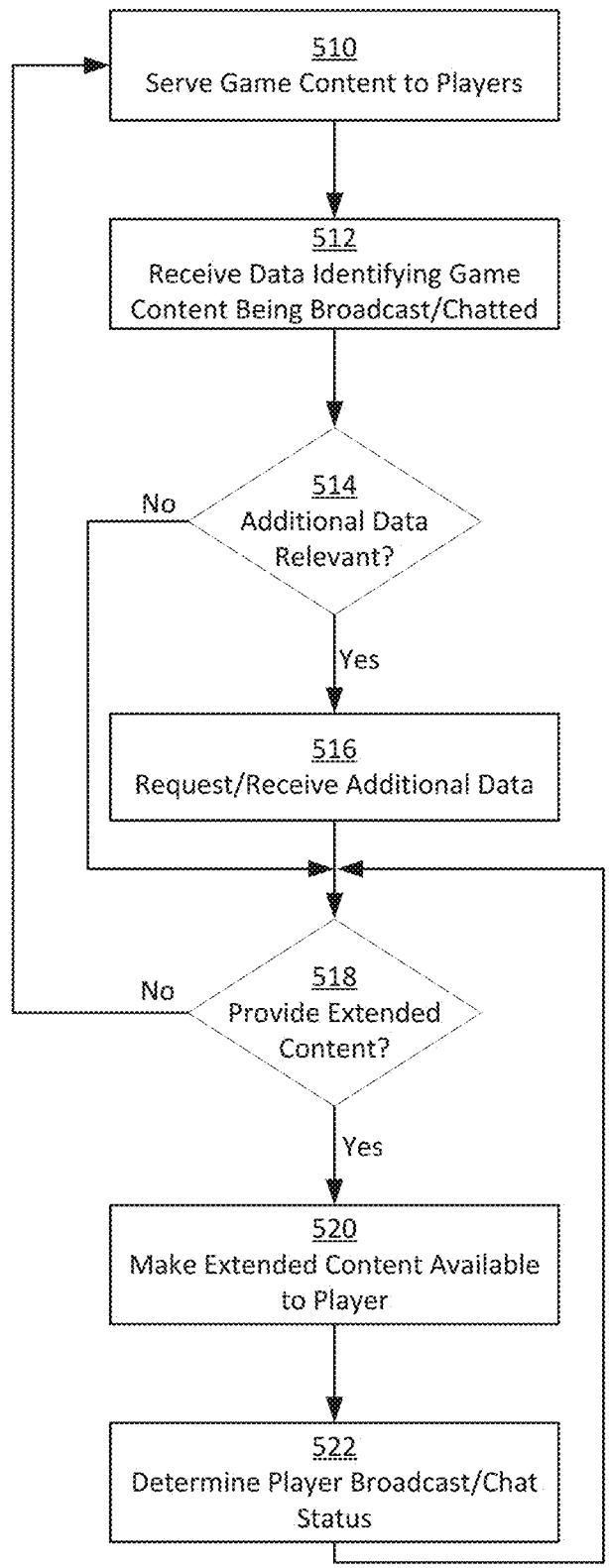
FIG. 5 depicts a flow diagram of example processing for providing extended content.

FIG. 5 depicts a diagram of example processing for providing extended game content to a game participant depending upon the game participant initiating activities related to the game such as, for example, broadcast streaming the gameplay to others and/or participating in a chat regarding the gameplay. As shown, at block 510, content item server 140, which may be referred to as game server 140, serves game content to one or more game players. For example, game server 140 may serve game content to game clients 111A, 111B executed on client devices 110A, 110B. The game content may be any that is suitable including, for example video game content. Game participants employ game clients 111A, 111B to communicate over a network with gaming server 140 and thereby engage in playing a game with each other.

In an example scenario, game client 111A receives user input data requesting to stream game output to non-participants. The input data may specify the particular non-participants to whom the game should be streamed. For example, the input data may specify that the game output be broadcast streamed to client device 110D. Alternatively, the inputs may specify that the game output should be streamed to viewers who have subscribed to receive streams from the particular game player. For example, Participant C operating client device 110C and Participant/Viewer E operating client device 110E may have subscribed to receive broadcasts of games played by participant A on client device 110A.

In an example scenario, game client 111A generates and transmits a request to broadcast streaming server 170. The request comprises any data suitable for initiating streaming of the game output. For example, the request may include data identifying a game account identifier associated with the particular game player making the request, data identifying the particular game, data identifying the particular game session that is to be broadcast, and data identifying the individuals/subscribers who should receive the broadcast stream. In the example scenario that Participant A at client device 110A initiates a broadcast request, the request may identify Participant A, the game session identifier 232 for the particular game session that Participant A has requested be broadcast, and data identifying viewers D and E on client devices 110D and 110E, respectively.

Broadcast streaming server 170 is programmed to receive the request, create a streaming session corresponding to the request, and communicate the game output received from game client 111A to viewers D and E at devices 110D and 110E who have been identified to receive the game output. In connection with creating and maintaining a streaming session, broadcast streaming server 170 collects and maintains data regarding each person that sends and receives a game stream, as well as details regarding the individual streaming sessions. For example, the broadcast streaming server may maintain data identifying each requested streaming session, the game player that requested the streaming session, the particular viewers that are viewing the stream, and the total number of viewers of the stream.

Broadcast streaming server 170, in addition to broadcasting the data stream, communicates an indication that a broadcast session has been initiated to game server 140 serving the game content to the game player. At block 512, the indication is received at game server 140. In an example embodiment, the indication comprises data identifying a broadcast streaming session, an identifier corresponding to the particular game player who is broadcasting the game stream, and data identifying the particular game and/or game session. In the example scenario wherein Participant A at client device 110A initiated broadcasting, broadcast streaming server 170 communicates data identifying a game account identifier 220 corresponding client device 110A which imitated broadcasting, data identifying the game session 232 being broadcast, and a stream session identifier 332 corresponding to the streaming session.

In addition, or alternatively to a game participant streaming game output to viewers, a game participant may engage in a chat session in connection with an ongoing game. In an example scenario, chat client 114A receives user input data requesting to establish a chat session with non-participants. The input data may specify the particular non-participants with whom the chat session should be established. For example, the input data may specify that a chat session be established with Viewers D and E operating client devices 110D and 110E.

In an example scenario, chat client 114A generates and transmits a request to chat server 190. The request comprises any data suitable for initiating a chat session. For example, the request may include data identifying a chat account identifier associated with the particular game player making the request, data identifying the particular game currently being played, data identifying the particular game session that is being played, and data identifying the individuals with whom the chat session should be established. In the example scenario that Participant A at client device 110A initiates a chat request, the request may identify Participant A, the game session identifier 232 for the particular game session that Participant A presently has ongoing, and data identifying Viewers D and E on client devices 110D and 110E, respectively.

Chat server 190 is programmed to receive the request, create a chat session corresponding to the request, and communicate the chat text between chat client 114A and chat clients 114D and 114E at devices 110D and 110E. In connection with creating and maintaining a chat session, chat server 190 collects and maintains data regarding each person that participates in a chat session, as well as details regarding the individual chat sessions. For example, the chat server 190 may maintain data identifying each requested chat session, the game player that requested the chat session, the other participants in the chat session, and the total number of chat participants.

Chat server 190, in addition to communicating chat data, communicates an indication that a chat session has been initiated to game server 140 serving the game content to the game player. At block 512, the indication is received at game server 140. In an example embodiment, the indication comprises data identifying a chat session, an identifier corresponding to the particular game player who initiated the chat session, and data identifying the particular game and/or game session engaged in by the player. In the example scenario wherein Participant A at client device 110A initiated the chat session, chat server 190 communicates data identifying a game account identifier 220 corresponding client device 110A which imitated the chat session, data identifying the game session 232 being played, and a chat session identifier 432 corresponding to the chat session.

In response to the indication that the game is being broadcast and/or a chat session has been initiated, at block 514, gaming server 140 determines whether additional information is needed in order to resolve whether or not extended game content should be made available to the particular game player who is broadcasting the game content and/or participating in a chat session. For example, gaming server 140 may determine that resolving whether or not extended content should be made available depends not only on whether the game output is being broadcast, but also on the number of viewers to whom the game is being broadcast. In addition or alternatively, gaming server 140 may determine that resolving whether or not extended content should be made available depends not only whether the game player has initiated a chat session, but also on the number of chat participants.

If game server 140 determines that additional data is needed, at block 516, in an example embodiment, game server 140 generates a request to broadcast streaming server 170 for additional data relating to the streaming session. In an example scenario wherein gaming server 140 determines additional data is needed regarding the number of viewers, game server 140 generates and transmits a request for data specifying the number of viewers of the broadcast stream. In an example scenario, the request may specify a streaming session identifier associated with the particular broadcast stream. In a scenario wherein a chat session has been established by a game player, at block 516, game server 140 may further generate a request to chat server 190 for additional data relating to the chat session. In an example scenario, gaming server 140 may determine additional data is needed regarding the number of chat participants and transmit a request for data specifying the number of chat participants to chat server 190.

Broadcast streaming server 170 receives the request and queries its data storage 180 for relevant information. For example, in the scenario where the request seeks the number of viewers of the broadcast stream, broadcast streaming server 170 queries streaming database 180 using the received streaming session identifier to determine the number of viewers of the particular data stream. In an example embodiment, streaming server 170 queries streaming session table 330 for total viewers 340 of the particular game session. Broadcast streaming server 170 transmits the responsive data to the game server.

In the scenario wherein game server 140 requested additional data regarding a chat session, chat server 190 receives the request and queries its data storage 192 for relevant information. For example, in the scenario where the request seeks the number of chat participants, chat server 190 queries chat database 192 using the received chat session identifier to determine the number of chat participants. In an example embodiment, chat server 190 queries chat database 192 for total participants 440.

Game server 140 receives the responsive data and stores it in its data store. For example, game server 140 may store in game session table 230 the received information in relation to the game session identifier for the particular game that is being broadcast. In the example scenario wherein the received data specifies the number of viewers of a broadcast streaming, game server 140 may store the number of streaming viewers 244 in relation to the corresponding stream session identifier 240 and game session identifier 232. In the example scenario wherein the received data specifies the number of chat participants, game server 140 may store the number of chat participants 252 in relation to the corresponding stream session identifier 240 and game session identifier 232.

At block 518, game server 140 uses the received information to determine whether or not the particular game player who is broadcasting the game output and/or participating in a game session should receive extended game content. In an example scenario, game server 140 comprises logic rules that require a threshold number of broadcast viewers before extended content is provided. In such an embodiment, game server 140 may compare the number of viewers of the particular game stream to a determined threshold. For example, game server 140 may determine whether the viewers of the broadcast stream exceeds a threshold of twenty viewers. In an example scenario, the logic rules implemented by game server 140 may additionally require that chat session be initiated and that a prescribed number of persons participate in the chat session. If game server 140 determines that the threshold for streaming viewers has not been satisfied, and/or the threshold number of chat participants has not been met, game server 140 continues providing game content without providing the extended content to the particular game player responsible for streaming the content. As shown in FIG. 5, game server 140 continues serving content to the players at block 510.

Figure 6A:
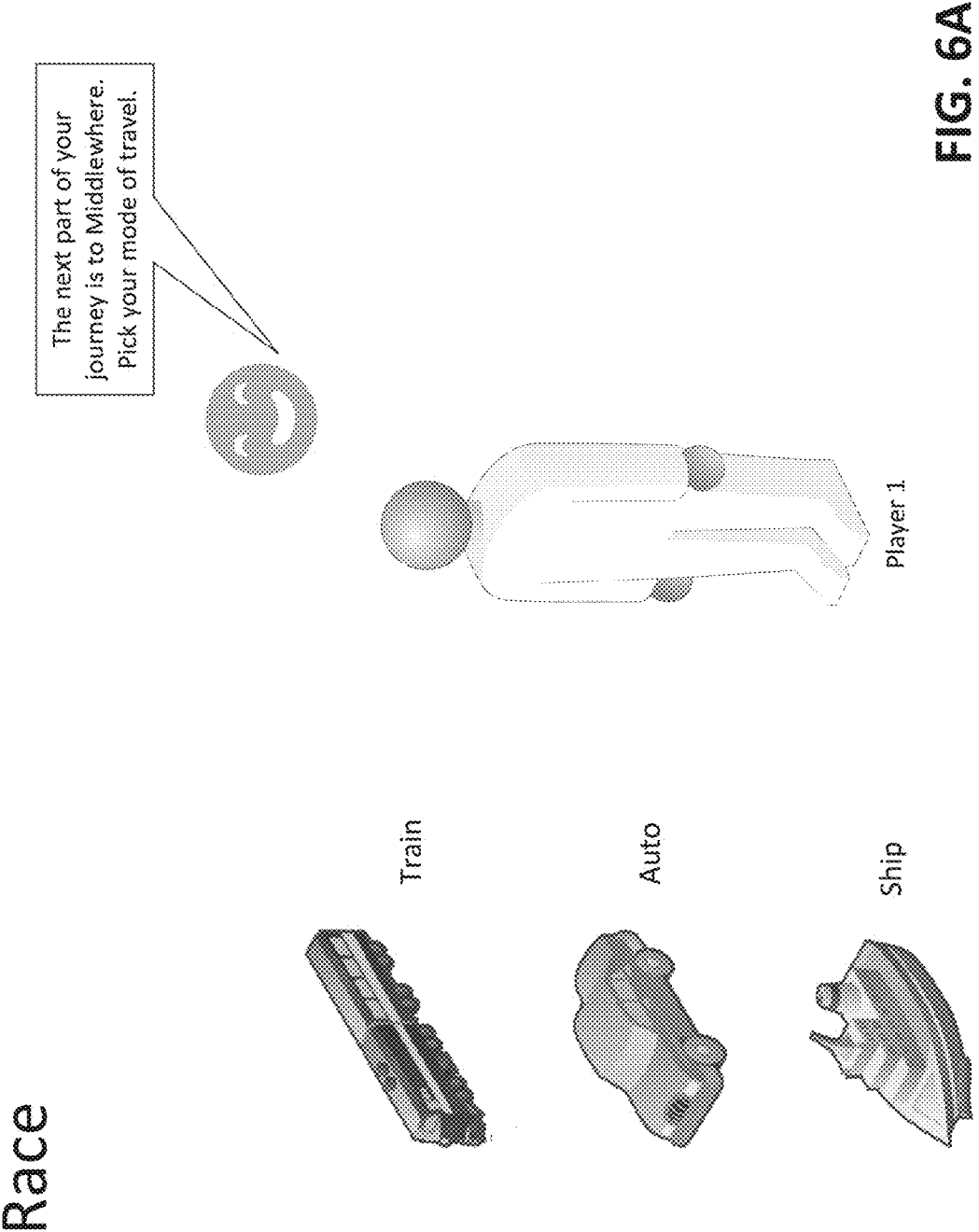
FIGS. 6A-B depict example user interfaces illustrating extended game content.
Figure 6B:
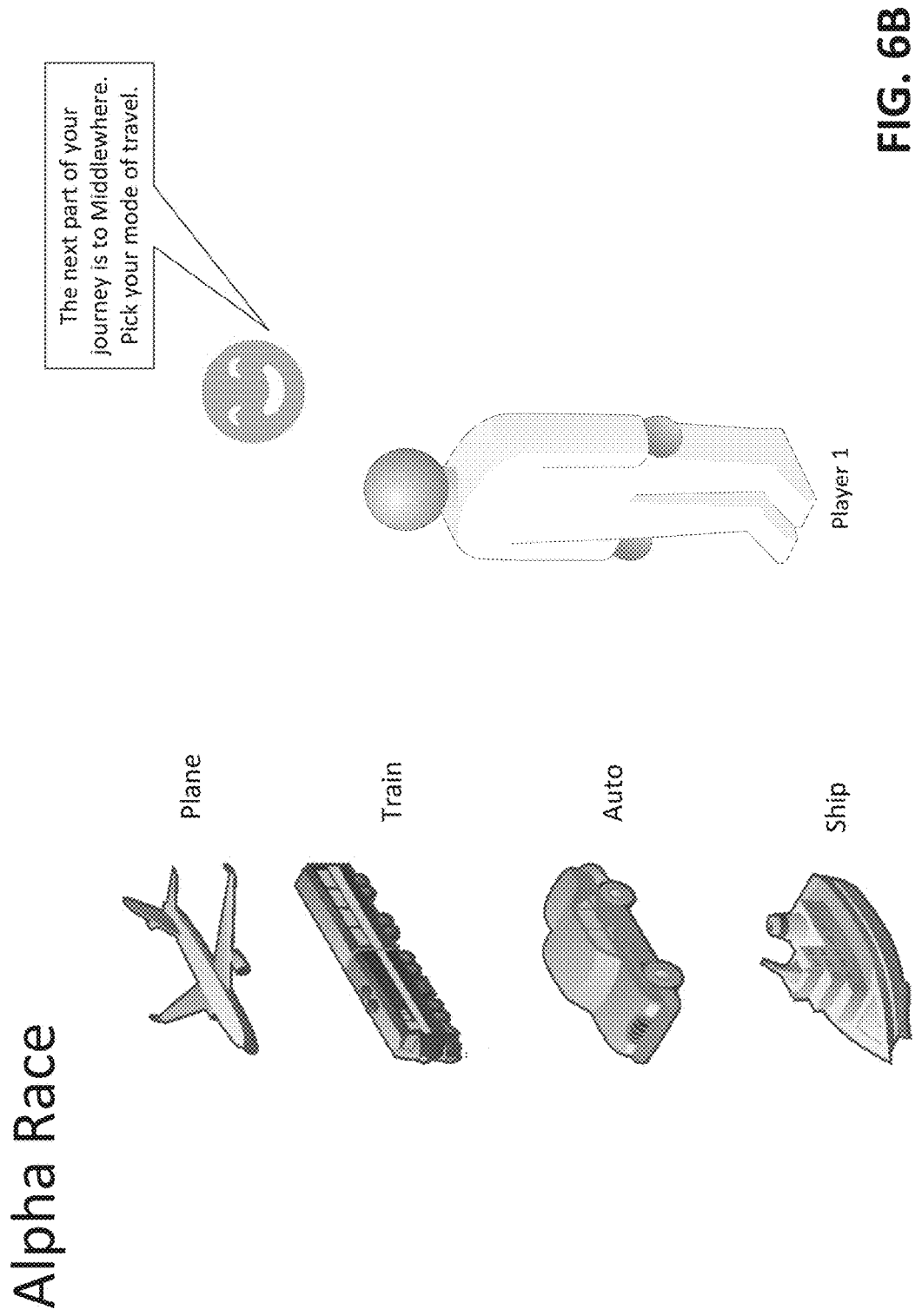

If at block 518 game server 140 determines that logic rules for providing extended content have been satisfied, game server 140 determines to make extended content available to the particular game player who is broadcasting the game. At block 520, game server 140 makes the extended content available to the particular game player. For example, in the instance Participant A operating client device 110A is broadcasting the gameplay, game server 140 makes extended content available to Participant A via game client 111A on client device 110A. The extended content is content that would not otherwise be available to the particular game participant and may be any content that is suitable for the particular game that is being broadcast. FIGS. 6A and 6B illustrate an example of extended content in the context of a game revolving around a race to various locations in a virtual world. In the example game, the game player is able to select a vehicle for use in completing a particular portion of the race. FIG. 6A depicts a user interface provided by the game with which the game player may select a vehicle for use in an upcoming portion of the race. As show, the user, Player 1, may select to travel either by train, auto, or ship. In the instance game server 140 has determined to provide extended content to the particular player, a user interface such as that depicted in FIG. 6B may be presented. As shown, FIG. 6B provides extended content in the form of an additional travel mode—a plane—which is not otherwise a selection available to the particular player as demonstrated in FIG. 6A. As a consequence of the particular player broadcasting the gameplay, the player has available to her an extended game feature.

Game server 140 makes the extended content available to the game player at the appropriate point in the particular game. For example, in the scenario depicted above in connection with FIGS. 6A and 6B, where the extended content is an additional vehicle type that is made available to the game player, the content is displayed to the game player at the point or location in the game flow where the player selects vehicles for use. Even though game server 140 may have determined that a particular game player is entitled to extended content, game server 140 may not present the additional content until a later time at which the extended content is relevant to the gameplay.

At block 522, game server 140 periodically determines whether the criteria for providing access to extended content continue to be satisfied. For example, after thirty minutes have passed since determining at block 518 to provide extended game content, game server 140 may request and receive updated data from broadcast streaming server 170 and/or chat server 190. Processing thereafter continues at block 518, at which game server 140 reevaluate whether or not the criteria for providing extended content continue to be satisfied. If so, game server 140 continues to provide the extended game content at block 520. If not, game server discontinues making the extended content available.

Example Processing Architecture

Figure 7:
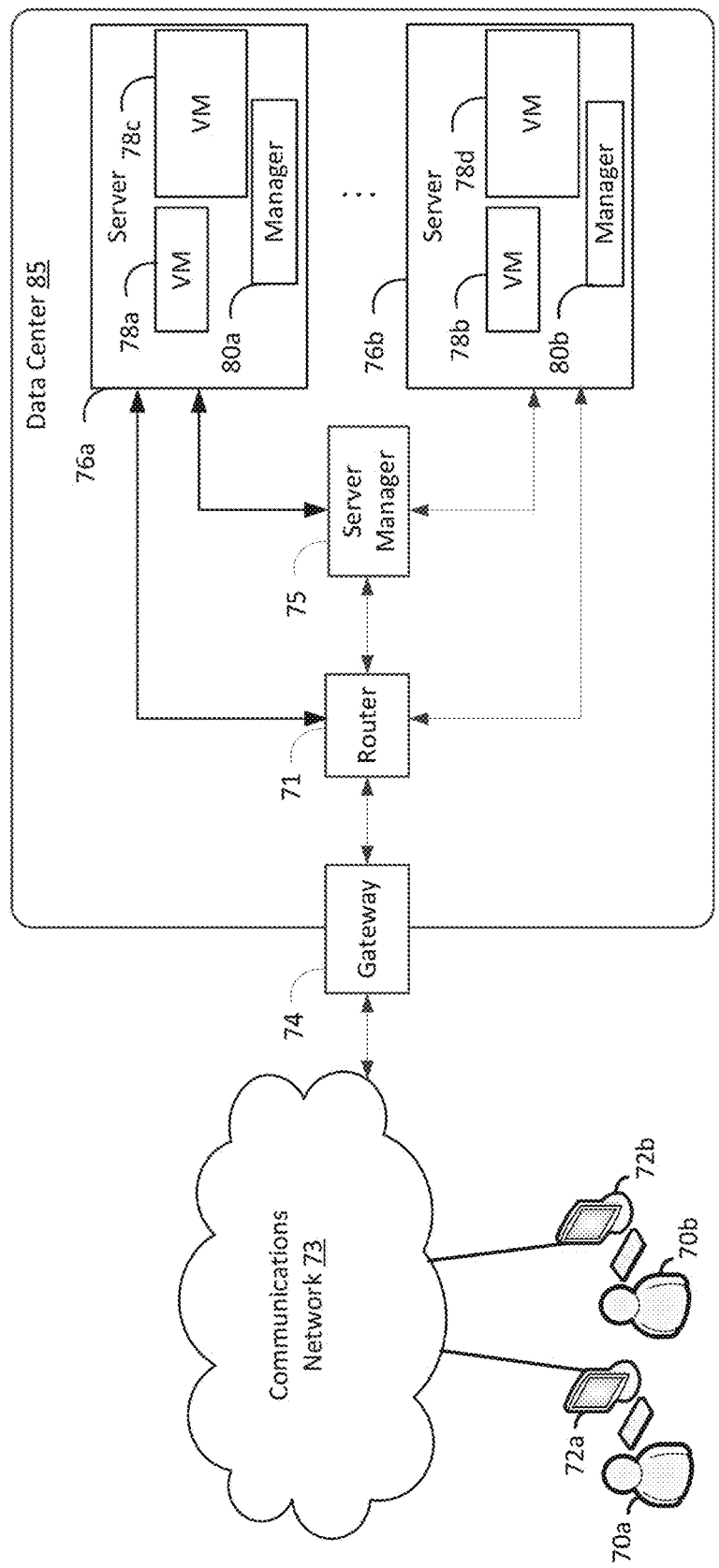
FIG. 7 depicts an example computing arrangement for implementing network accessible services.

It will be appreciated that the processing described in connection with FIG. 5 may be comprised in a system architecture adapted to provide web services or cloud based services. Client nodes 110A-E may access the server systems 140, 170, and 190 via any suitable networking system which may comprise the Internet and/or World Wide Web. FIG. 7 depicts an example operating environment suitable for providing online services such as those described herein in connection with servers 140, 170, and 190.

FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In an example embodiment, virtual machine instances 78c and 78d may be instances of content item server 140 and/or streaming content server 170. The virtual machine instances 78c and 78d may be configured to perform all, or any portion, of the techniques for providing content items such as gaming services and/or streaming services and/or any other of the disclosed techniques in accordance with the present disclosure and described in detail above. As should be appreciated, while the particular example illustrated in FIG. 7 includes one virtual machine in each server, this is merely an example. A server may include more than one virtual machine or may not include any virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
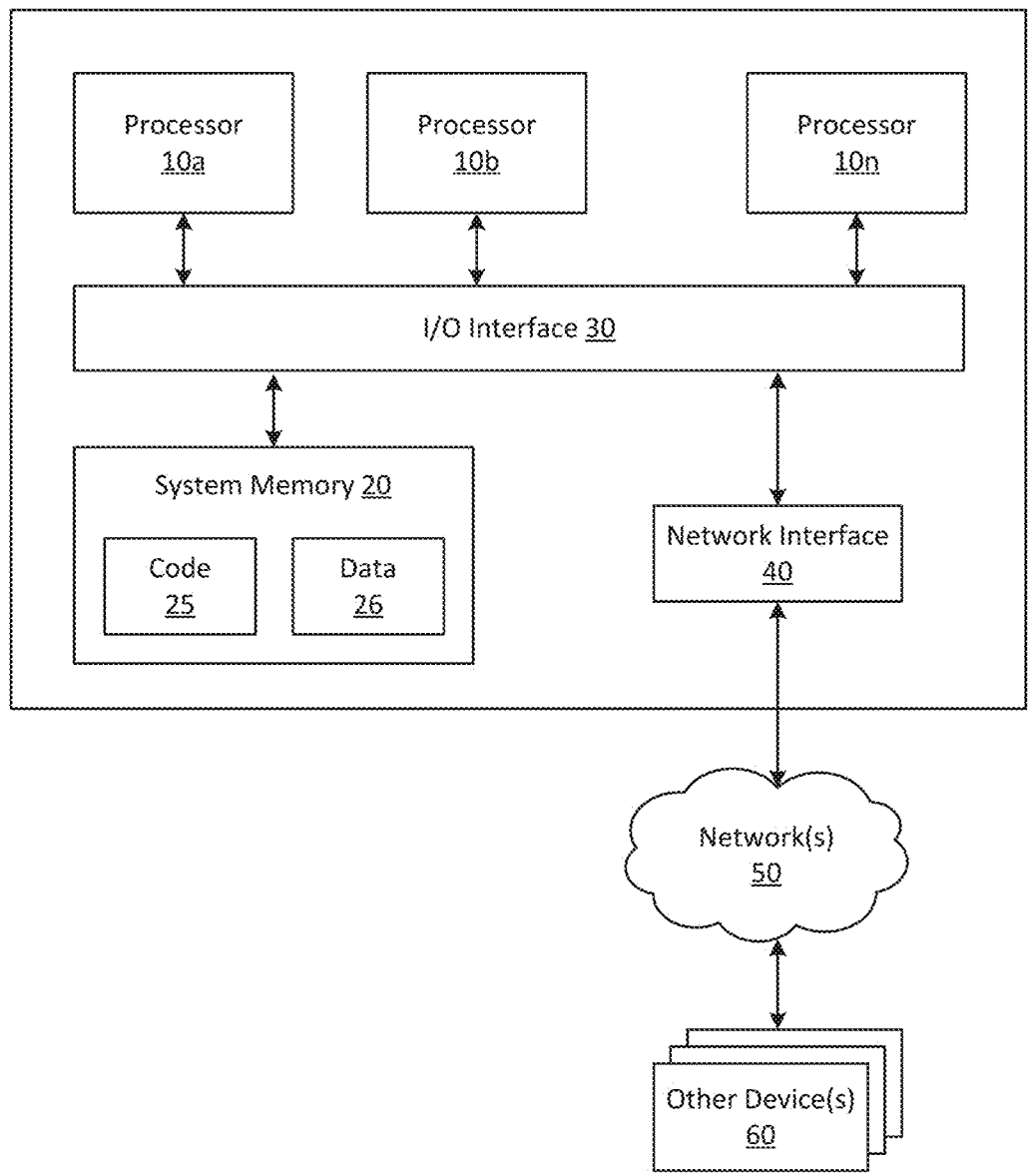
FIG. 8 depicts an example computing system.

In at least some embodiments, client nodes 110A-E and servers such as servers 140 and 170 that implement a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a plurality of communicatively coupled computing nodes forming a multi-node network; and
one or more non-transitory computer-readable storage media having stored thereon instructions that cause the one or more computing nodes to perform operations comprising:
serving game content to a game client executing on a client device, the game client associated with a first game user;
receiving, from a broadcast streaming server, an indication the first game user is broadcasting the game content from the game client to one or more user devices via the broadcast streaming server, wherein the broadcast streaming server maintains data identifying requested streaming sessions, game users that requested the streaming sessions, and numbers of viewers of the streaming sessions;
retrieving, from the broadcast streaming server, data identifying a first number of viewers to which the first game user is broadcasting the game content;
determining the first number of viewers to which the first game user is broadcasting the game content satisfies a threshold;
determining, based at least upon the indication the first game user is broadcasting the game content to one or more user devices and the first number of viewers satisfying the threshold, to provide extended game content to the first game user; and
providing the extended game content to the game client on the client device.

2. The system of claim 1, further comprising:
determining the first game user has stopped broadcasting the game content from the game client to one or more user devices; and
ceasing to provide the extended game content to the game client on the client device.

3. A method, comprising:
serving, by a content server, content to a client device associated with a first content user;
receiving, by the content server, from a broadcast streaming server, an indication the first content user is broadcasting content received from the content server to one or more viewers via the broadcast streaming server, wherein the broadcast streaming server maintains data identifying requested streaming sessions, content users that requested the streaming sessions, and numbers of viewers of the streaming sessions;
determining, by the content server, based at least upon the indication the first content user is broadcasting content to one or more viewers, to provide additional content to the first content user; and
serving, by the content server, the additional content to the client device.

4. The method of claim 3, wherein:
serving content to the client device comprises serving game content.

5. The method of claim 4, wherein:
determining to provide additional content to the first content user comprises determining to provide additional game content to the first content user; and
serving the additional content to the client device comprises serving the additional game content.

6. The method of claim 5, wherein additional game content comprises one or more of the following: an additional game character; an additional game scenario; an additional game feature; or an additional game function.

7. The method of claim 3, further comprising:
receiving data identifying a first number of viewers to whom content is being broadcast by the first content user via the broadcast streaming server.

8. The method of claim 7, wherein receiving data identifying a first number of viewers to whom content is being broadcast by the first content user comprises receiving data identifying a first number of viewers from the broadcast streaming server.

9. The method of claim 8,
wherein determining to provide additional content to the first content user comprises determining, based at least upon the indication the first content user is broadcasting content to one or more viewers and the first number of viewers to whom content is being broadcast by the first content user, to provide additional content to the first content user.

10. The method of claim 9,
wherein determining based at least upon the first number of viewers to whom content is being broadcast by the first content user to provide additional content to the first content user comprises determining the first number of viewers to whom content is being broadcast exceeds a threshold.

11. The method of claim 9, further comprising:
receiving, by the content server, data identifying the first content user is engaged in a chat session with at least one of the one or more viewers; and
receiving, by the content server, data identifying a number of chat participants engaged in the chat session;
wherein determining to provide additional content to the first content user comprises determining, based at least upon the data identifying the first content user is engaged in a chat session, the number of chat participants, the indication the first content user is broadcasting content to one or more viewers, and the number of viewers to whom content is being broadcast by the first content user, to provide additional content to the first content user.

12. The method of claim 3,
wherein receiving an indication the first content user is broadcasting content from the content server to one or more viewers comprises receiving the indication from the broadcast streaming server.

13. The method of claim 3, further comprising:
receiving, by the content server, data identifying the first content user is engaged in a chat session with at least one of the one or more viewers;
wherein determining to provide additional content to the first content user comprises determining, based at least upon the data identifying the first content user is engaged in a chat session and the indication the first content user is broadcasting content to one or more viewers, to provide additional content to the first content user.

14. The method of claim 3, further comprising:
receiving, by the content server, an indication the first content user is no longer broadcasting content received from the content server to one or more viewers via the broadcast streaming server; and
determining, by the content server, based at least upon the indication the first content user is no longer broadcasting content received from the content server to one or more viewers via the broadcast streaming server, to discontinue serving the additional content to the client device.

15. One or more non-transitory computer-readable storage media having stored therein instructions that, upon execution by one or more computing devices, cause the one or more computing devices to perform operations comprising:
serving, by a content server, content to a client device associated with a first content user;
receiving, by the content server, from a broadcast streaming server, an indication the first content user is broadcasting content received from the content server to one or more viewers via the broadcast streaming server, wherein the broadcast streaming server maintains data identifying requested streaming sessions, content users that requested the streaming sessions, and numbers of viewers of the streaming sessions;
determining, by the content server, based at least upon the indication the first content user is broadcasting content to one or more viewers, to provide additional content to the first content user; and
serving, by the content server, the additional content to the client device.

16. The one or more non-transitory computer-readable storage media of claim 15, wherein:
serving content to the client device comprises serving game content.

17. The one or more non-transitory computer-readable storage media of claim 15, wherein:
determining to provide additional content to the first content user comprises determining to provide additional game content to the first content user; and
serving the additional content to the client device comprises serving the additional game content.

18. The one or more non-transitory computer-readable storage media of claim 15, wherein additional game content comprises one or more of the following: an additional game character; an additional game scenario; an additional game feature; or an additional game function.

* * * * *